United States Patent [19]
Gawlick et al.

[11] 4,160,062
[45] Jul. 3, 1979

[54] PYROTECHNICAL SEALING CORD

[75] Inventors: Heinz Gawlick, Vagen, Fed. Rep. of Germany; Axel Homburg, Troisdorf, Fed. Rep. of Germany; Werner Siegelin, Nuremberg, Fed. Rep. of Germany; Gunther Marondel, deceased, late of Erlangen, Fed. Rep. of Germany, by Gisela M. Marondel, executrix

[73] Assignee: Dynamit Nobel Aktiengesellschaft, Fed. Rep. of Germany

[21] Appl. No.: 671,062

[22] Filed: Mar. 29, 1976
(Under 37 CFR 1.47)

[30] Foreign Application Priority Data

Mar. 27, 1975 [DE] Fed. Rep. of Germany ....... 2513568
Apr. 18, 1975 [DE] Fed. Rep. of Germany ....... 2517323

[51] Int. Cl.² .................... B32B 1/04; B32B 3/02; B32B 33/00
[52] U.S. Cl. ..................................... 428/365; 149/15; 401/1; 403/28; 428/58; 428/313; 428/913; 428/68; 521/92
[58] Field of Search .................. 149/15; 102/27 R; 49/477; 403/28; 428/36, 58, 68, 313, 413, 365; 401/1; 260/2.5 H, 2.5 HA

[56] References Cited

U.S. PATENT DOCUMENTS

| 1,702,206 | 2/1929 | Fritzsche | 102/27 R |
| 2,891,475 | 6/1959 | Dolan et al. | 102/27 R |
| 3,294,602 | 12/1966 | Francis et al. | 149/15 |
| 3,320,882 | 5/1967 | Schulz | 102/27 R |
| 3,551,223 | 12/1970 | Deal et al. | 149/15 |
| 3,621,559 | 11/1971 | Welsh | 102/27 R X |
| 3,624,237 | 11/1971 | Persson | 149/15 X |
| 3,802,970 | 4/1974 | Bishop et al. | 149/15 |

Primary Examiner—Richard D. Lovering
Attorney, Agent, or Firm—Craig and Antonelli

[57] ABSTRACT

A pyrotechnical sealing material comprises a heat-foamable synthetic resin capable of being foamed with the aid of a burnable pyrotechnical composition. The sealing material is in the form of a cord having a core made of the pyrotechnical composition and a casing separated from the core by a flexible sheath. The casing is formed from the heat-foamable synthetic resin.

11 Claims, 1 Drawing Figure

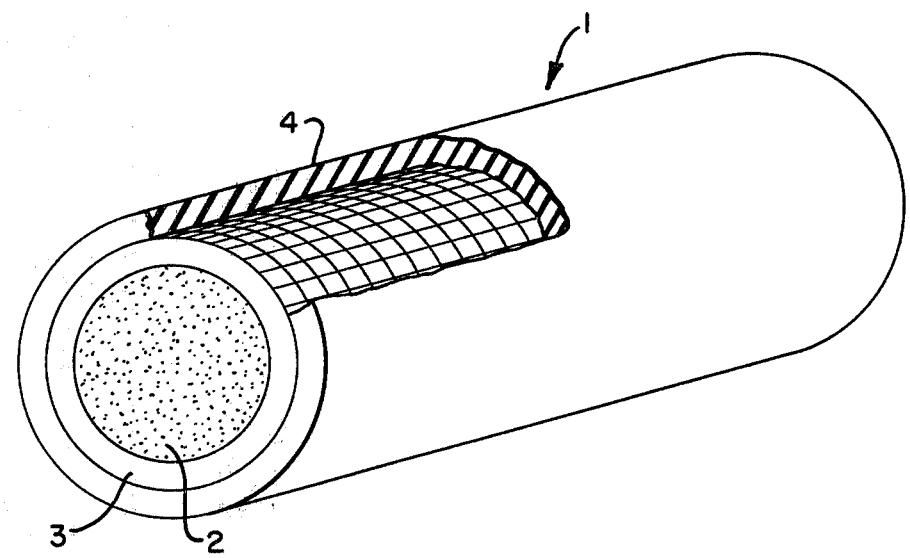

PYROTECHNICAL SEALING CORD

The present invention relates to pyrotechnical sealing materials, particularly cords, which are made to operate on the principle that a foamable, synthetic resin will foam with the aid of the heat developed by a burning pyrotechnical composition and will penetrate during the foaming process, into the hollow spaces to be sealed.

Sealing material formed to operate on this principle can be used with great versatility. The material is suitable for all types of applications wherein two parts cannot be joined together without seams in a sealing manner. Such material is especially suitable in cases where the sealing of such seams e.g. junctions, joints and the like becomes too expensive with the use of sealing strips, cords, panels, or sealing compound to be injected therein, or where such sealing procedures are no longer possible in some cases since an advanced stage of the processing operation has been reached.

Pyrotechnical sealing material has been known which is in the form of sealing bars or rails. The corresponding devices using this form of sealing material are fashioned so that the pyrotechnical mixture is accommodated in one bar and the foamable synthetic resin is housed in a second bar disposed beside the first bar. The seal can be produced during the foaming step in only one direction.

The disadvantage of these sealing bars resides in that they can only be adapted to linearly extending contours. Seams which extend irregularly cannot be sealed thereby.

Furthermore, the manufacture of such sealing bars is very expensive, since in addition to providing a dimensional constancy for the bars, there must also be a satisfactory heat-conducting connection of the pyrotechnical bar with the bar filled with a synthetic resin.

These disadvantages are eliminated when using the pyrotechnical sealing material of the present invention, that is, in the form of a sealing cord, the cord having a core that consists of the pyrotechnical composition and a casing that is separated from the core by a flexible sheath and that consists of a heat-foamable synthetic resin.

Such a sealing cord no longer exhibits the disadvantages of the conventional sealing bars. The sealing cord can be utilized in all those cases where nonlinearly extending joints or fissures are to be sealed.

Furthermore, the sealing cord can be used where a sealing operation in more than a single direction is desirable and necessary.

The pyrotechnical composition utilizable in the sealing cord as its core is to be deflagrated without the evolution of a gas under a heat generation of, if at all possible, not below 150° to 200° C. Such heat generation is attained if 500–900 cal/g. is liberated during the burning of the composition. Furthermore, the pyrotechnical composition is to yield, after deflagration, a residue in the form of a solid slag, that is, of approximately the same volume as the composition proper before the burning step.

Such compositions are known per se. They contain as the combustible component preferably silicon or iron and as the oxidizing agent preferably $Fe_2O_3$ or manganese dioxide. Other suitable combustible components include Al, Ti, Mn-Si-alloy and Mn. It is also possible to use alkaline earth nitrates as the oxidizing agents. The percentage proportion of these substances with respect to one another and in the composition depends on the desired heat generation. If the evolving heat is too high, this heat can optionally be adjusted to a desired value by the addition of inert substances acting as moderators. An example of such a conventional moderator is $CaSO_4$.

Furthermore, deflagration regulators can furthermore be added to the mixtures forming the pyrotechnical compositions, such as CuO or $V_2O_5$. The pyrotechnical composition is to have a burning rate of about 5–10 min./m.

The sheathing material between the pyrotechnical composition and the coaxially disposed, foamable thermoplastic located thereabove can consist of a metallic fabric, deformable metallic tubes, or also spun and/or wound synthetic resin threads. However, the metals employed must not be any low-melting or readily oxidizable metals, such as, for example, Mg, Si, Al. Metals usable in the pyrotechnical composition, such as, for example, Cu, Fe, Ni can, however, be utilized. Further examples for usable sheathing materials are metallic meshworks of zinc. Also metal alloys can be employed, insofar as they meet the aforementioned conditions. The thickness of this sheath is dependent on the purpose for which the sealing cord is to be used, and on the width of the joint; this thickness can vary between 0.05 and 10 mm.

Suitable foamable synthetic resins are the conventional thermoplastics and elastomers which are also utilized in the conventional sealing bars. These synthetic resins already contain the blowing agents necessary for the individual types, which liberate, under the effect of an elevated temperature, i.e. (120°–200° C.), gases effecting the foaming of the synthetic resin. The synthetic resins usable in this connection are to be plastic prior to foaming as well as in the form of the foam, so that they can penetrate into joints or other hollow spaces. In principle, all foamable thermoplastics are useful for this purpose, for example PVC, polyolefins, polyurethanes, polystyrene, or elastomers, such as neoprene rubber or ABS (i.e. acrylonitrile-butadiene-styrene) rubber.

The blowing agents are chosen in accordance with the thermoplastic employed. In addition to ammonium carbonate or sodium bicarbonate, especially suitable are gas-evolving or gas-liberating azo- or hydrazo-compounds, such as, for example $\alpha, \alpha'$-azoisobutyrodinitrile or diphenylsulfone-3,3'-disulfone hydrazide or azodicarbonamide. However, it is also possible to use other blowing agents known in the production of synthetic resin foams.

The sealing cords of this invention can be manufactured in several ways.

During the production of short cords, a flexible metallic tube or a hose formed of a metal fabric, as used, for example, in the shielding of coaxial cables, is filled with the pyrotechnical composition and thereafter the filled tube or hose is enveloped or encompassed by the foamable synthetic resin. In case of the shortened cords, a prefabricated hose or tube made of the foamable synthetic resin can be inverted over the fitted tube; in case of longer sealing cords, the synthetic resin is extruded in the form of a tube over the metal tube or hose at temperatures below the decomposition temperature of the blowing agent.

If the foamable synthetic resin is present in the form of a powder or granules, the sealing cords can also be manufactured analogously to the production of fuzes. In this procedure, the pyrotechnical composition is provided with a sheath of synthetic fibers, e.g. PVC fibers, prepared according to the spinning method. This encased pyrotechnical composition is surrounded with an envelope of the synthetic resin, which envelope is provided with a wound cover of a synthetic resin film and is optionally provided with an outer layer spun from threads of synthetic resin fibers. In principle, this manufacturing method is carried out as disclosed in German Patent No. 1,916,685, utilizing, in place of penthrite, the pyrotechnical composition and, in place of the encasing substance, the foamable synthetic resin in powder or granule form.

A typical construction of the invention is shown in the drawing wherein reference numeral 1 designates the cord-shaped sealing material of the invention. Within the cord is a core 2 of a pyrotechnical composition. A sheath 3 made of Cu mesh surrounds the core and separates it from a casing or envelope 4 of foamable synthetic resin such as polyvinyl chloride.

The sealing cords of this invention and the methods for forming them will be further understood from the following examples.

EXAMPLE 1

A pyrotechnical composition (10 gm) consisting of:
- 46.7% by weight of $Ba(NO_3)_2$
- 37.5% by weight of silicon
- 9.3% by weight of $Fe_2O_3$
- 6.5% by weight of $CaSO_4$ is filled into a hose of a metallic fabric, i.e. Cu having an inner diameter of about 5 mm. and a length of 100 mm. and thereafter the metal fabric covered by a hose of neoprene rubber containing $\alpha,\alpha'$-azoisobutyrodinitrile as the blowing agent and having a thickness of 2 mm. After igniting the pyrotechnical composition, the composition burns uniformly at a burning rate of 4.3 sec./cm. and causes foaming of the neoprene rubber, increasing the volume thereof by 60%, i.e. the thickness increased to 3.2 mm.

EXAMPLE 2

Analogously to Example 1, a hose made of a metallic fabric, i.e. a fabric of Ni having an inner diameter of 4 mm. and a length of 35 mm. is filled with 58 gm of a pyrotechnical composition consisting of:
- 40 parts by weight of $MnO_2$ (80–85% strength)
- 15 parts by weight of $Fe_2O_3$
- 3.5 parts by weight of polyvinyl acetate (as the binder)
- 45 parts by weight of silicon.

This fabric hose is covered with a tube of foamable polyethylene having a thickness of 6 mm. and the composition is ignited. The burning rate is 3.8 sec./cm. The polyethylene is thus transformed into an elastic foam with a thickness of 8.7 mm.

What is claimed is:

1. A pyrotechnical sealing material wherein a heat-foamable synthetic resin is foamed with the aid of heat generated from a burnable pyrotechnical composition that is capable of being burned without the evolution of gas, said sealing material being in the form of a cord, said cord having a core comprising the pyrotechnical composition and a casing separated from the core by a flexible sheath formed of metal or a synthetic resin thread, said metal not being a low melting or readily oxidizable metal and, said casing comprising the heat-foamable synthetic resin.

2. A pyrotechnical sealing material according to claim 1, wherein the sheath surrounding the core consists of a hose made from a metallic fabric.

3. A pyrotechnical sealing material according to claim 1, wherein the sheath surrounding the core consists of a flexible metallic tube.

4. A pyrotechnical sealing material according to claim 1, wherein the sheath surrounding the core consists of synthetic resin threads which are spun around the core to form a winding envelope.

5. A pyrotechnical sealing material according to claim 1, wherein the foamable synthetic resin comprises neoprene rubber.

6. A pyrotechnical sealing material according to claim 1, wherein the pyrotechnical composition contains silicon or iron as a combustible component.

7. A pyrotechnical sealing material according to claim 1, wherein the pyrotechnical composition is a mixture containing a combustible component and an oxidizing agent, said mixture being capable of generating 500–900 calories of heat per gram of said mixture.

8. A pyrotechnical sealing material according to claim 1, wherein said heat-foamable synthetic resin is a thermoplastic or elastomer containing a blowing agent which liberates gas upon application of the heat generated by said pyrotechnical composition thereby foaming said synthetic resin.

9. A pyrotechnical sealing material according to claim 8, wherein said pyrotechnical composition is capable of yielding a residue in the form of a solid slag.

10. A pyrotechnical sealing material according to claim 9, wherein the solid slag yielded upon deflagration of said pyrotechnical composition has approximately the same volume as the pyrotechnical composition prior to deflagration.

11. A pyrotechnical sealing material according to claim 10, wherein said pyrotechnical composition has a burning rate of about 5 to 10 minutes per meter.

* * * * *